United States Patent [19]
Scherzer et al.

[11] 3,966,643
[45] June 29, 1976

[54] RARE EARTH TRANSITION METAL EXCHANGED FAUJASITES AND CATALYSTS PREPARED THEREFROM

[75] Inventors: Julius Scherzer; Philip K. Maher, both of Baltimore, Md.

[73] Assignee: W. R. Grace & Co., New York, N.Y.

[22] Filed: Feb. 15, 1974

[21] Appl. No.: 442,981

Related U.S. Application Data

[63] Continuation-in-part of Ser. No. 232,309, March 6, 1972, abandoned, which is a continuation of Ser. No. 50,359, June 26, 1970, abandoned, which is a continuation-in-part of Ser. No. 854,305, Aug. 29, 1969, abandoned.

[52] U.S. Cl. ............................................ 252/455 Z
[51] Int. Cl.² ...................................... B01J 29/06
[58] Field of Search .............................. 252/455 Z

[56] References Cited
UNITED STATES PATENTS 3,271,418  9/1966  Plank et al. ....................... 208/120

*Primary Examiner*—Carl F. Dees
*Attorney, Agent, or Firm*—Joseph P. Nigon

[57] ABSTRACT

A novel mixed rare earth-transition metal exchanged faujasite is prepared by exchanging alkali metal faujasite with a mixture of rare earth and transition metal salts at a pH of about 3.5. The novel faujasite, which contains 0.2 to 3% transition metal and 2 to 14% rare earths, (both ranges expressed as oxides), is used as a hydrocarbon conversion catalyst or as a component in a zeolite promoted hydrocarbon conversion catayst.

7 Claims, No Drawings

RARE EARTH TRANSITION METAL EXCHANGED FAUJASITES AND CATALYSTS PREPARED THEREFROM

This application is a continuation-in-part of Ser. No. 232,309 filed Mar. 6, 1972, which is a continuation of Ser. No. 50,359 filed June 26, 1970, which is a continuation-in-part of Ser. No. 854,305 filed Aug. 29, 1969 all now abandoned.

It is generally known that zeolites such as synthetic faujasite having a silica alumina ratio on the order of about 2.5 to 6.0 may be combined with an inorganic amorphous matrix material to form a highly effective hydrocarbon conversion catalysts. These catalysts which generally contain from about 5 to 50% by weight zeolite are generally referred to as zeolite promoted catalysts. These zeolite promoted catalysts when applied to catalytic cracking operations are found to possess an extremely high degree of activity. Furthermore, zeolite promoted catalysts tend to selectively produce a large proportion of desired end products from a given feedstock.

Attempts have been made to improve the activity and selectivity of zeolite promoted catalysts by modification of the zeolitic structure and composition. Typically, zeolites, and particularly faujasites, have been exchanged with a variety of metal cations and subjected to thermal and chemical treatments to enhance the thermal stability and catalytic characteristics thereof. It has been found that rare earth exchanged faujasites which have been subjected to a calcination treatment are particularly effective promoters for catalytic cracking catalysts. However, it is frequently observed that rare earth exchanged faujasite when combined in cracking catalysts tend to produce relatively large amounts of coke and undesirable dry gas ($H_2$, $C_1$ and $C_2$ hydrocarbons) by-products.

It is therefore an object of the present invention to provide an improved zeolite promoter for hydrocarbon conversion catalysts.

It is another object to provide rare earth containing synthetic faujasites which possess a high degree of thermal stability, activity and selectivity when used as a hydrocarbon cracking catalyst additive.

It is yet a further object to provide an improved zeolite promoted hydrocarbon cracking catalyst which selectively produces large amounts of high octane gasoline and desirable olefinic products and a minimal amount of coke and dry gases.

It is still another object of the present invention to provide a novel metal exchanged faujasite which possesses a high degree of thermal stability and catalytic activity and also possesses a silica-alumina content substantially the same as the parent faujasite.

It is still yet another object to provide a method for providing a high stable metal exchanged faujasite wherein the faujasite is thermally stabilized without attendant loss of alumina from the crystalline structure thereof.

These and still further objects of the present invention will become readily apparent to one skilled in the art from the following detailed description and specific examples.

Broadly, our invention contemplates novel mixed rare earth-transition metal exchanged faujasites which possess an extremely high degree of activity and desirable catalytic selectivity when used as a promoter for hydrocarbon conversion catalysts.

More specifically, we have found that when alkali metal faujasite having a silica alumina ratio on the order of about 2.5 to 6.0 is exchanged with about 0.2 to 3% by weight transition metal ion expressed as oxides, and 2 to 14% by weight rare earth ions expressed as oxides at a pH of about 2.0 to 4.0, subsequently calcined at a temperature from about 600° to 1500°F. and washed to remove alkali metal oxides to a level below about 0.7% by weight, an extremely stable and active zeolite promoter is obtained which possesses substantially the same silica alumina content as the initial faujasite.

Our novel zeolites may be combined with amorphous inorganic matrix materials such as silica, alumina, slica-alumina, clay and combinations thereof in amounts ranging from about 5 to 50% by weight to form highly effective hydrocarbon conversion catalysts. The present zeolites, particularly the chromium derivative, promote the formation of high octane non-leaded gasoline when used as a component in hydrocarbon cracking catalyst.

To prepare the novel zeolites of the present invention an alkali metal form of faujasite normally described as alkali metal type X or alkali metal type Y faujasite having a silica alumina ratio falling within the continuous range of 2.5 to 6.0 is utilized as a starting material. Preferably the sodium form of type X or type Y zeolite (identified herein as NaX or NaY) is used as the starting material. In general, while the silica alumina ratio of the starting faujasite may be as low as 2.5, it is generally preferred that a higher silica containing faujasite having a silica alumina ratio of about 3, and preferably on the order of 5 to 6, be used to form the herein described products.

To obtain the desired form of exchanged faujasite the sodium form of the faujasite is contacted with an aqueous solution of both rare earth and transition metal salts. In general, the metal salts may be in the form of rare earth and transition metal chlorides, sulfates, nitrates and other water soluble compounds of these metal ions. However, it is generally preferred that the rare earth and transition metal chlorides be used.

The rare earth metal ions used in the preparation of the present faujasite are normally mixtures of rare earths such as lanthanum, cerium, praseodymium, neodymium, samarium and gadolinium. In the ordinary rare earth mixtures of commerce, it is generally found that cerium and lanthanum predominate. Typical rare earth mixtures used will contain about 1 to 55 percent cerium, (as $CeO_2$), 20 to 80 lanthanum, (as $La_2O_3$) and the remainder will consist of minor amounts of other rare earths material above.

Transition metal ions which may be exchanged into our novel faujasites include chromium, iron and mixtures thereof.

As indicated above, the amounts of rare earth exchanged into the faujasite will range from about 2 to 14 percent by weight expressed as rare earth metal oxides, normally $RE_2O_3$. The transition metal ion content of our novel faujasites will range from about 0.2 to 3 percent by weight expressed as transition metal oxides, $M_{2/n}O$, wherein $n$ represents the valence of the transition metal ion M. Unless otherwise stated, the rare earth and transition metal ion content of the novel faujasites disclosed in this description will be described in terms of oxides.

The metal ion containing solutions which are used to exchange the sodium form of faujasite preferably contain from about 0.1 to 0.4 moles per liter rare earth ion and from about 0.01 to 0.2 moles per liter of transition metal ion. The pH of the metal containing exchange solution is adjusted to about 2 to about 4 and preferably on the order of about 3 to 3.5. The pH adjustment is readily accomplished by the addition of suitable mineral acid such as hydrochloric, sulfuric, and nitric acids.

To achieve the desired degree of exchange, the sodium sieve is immersed in the metal ion containing exchange solution for periods ranging from about 0.1 to 3 hours. Preferably the temperature of the solution is maintained at from about 80° to 105°C. During the exchange with the metal ions, the alkali metal content of the initial sieve is reduced until about 65 to 100% of the alkali metal initially present is replaced with the rare earth, transition metal and hydrogen ions.

Subsequent to the exchange with the rare earth transition metal solution the exchange faujasite product is calcined, i.e. heated, at a temperature of from about 600° to 1500°F. for a period of 0.1 to 3 hours. Subsequent to this calcination, the faujasite product is further washed or exchanged with ammonium sulfate solution or other ammonium salts until the sodium content of the faujasite is reduced to a level of from about 0.05 to 1.0% by weight based on $Na_2O$. This final exchange can be achieved either on the pure sieve or the composite catalyst after the sieve has been incorporated into a matrix.

It is found that the novel rare earth-transition metal exchanged product of the present invention possesses a superior thermal and hydrothermal stability which is illustrated by retention of substantial surface area after treatment with steam at elevated temperatures. For example, the present compositions are found to possess an initial surface area on the order of 750 to 950 meters square per gram. Subsequent to hydrothermal treatment, which involves heating in the presence of saturated steam at a temperature on the order of 1400° to 1600°F., it is found the present materials will retain from 70 to 80% of the original surface area. Hence, when the subject products are subjected to a 1350° steam treatment, which is conventionally applied to faujasite used in the preparation of typical cracking catalyst compositions, it is found the present materials will retain a surface area on the order of 500 to 700 meters square per gram after an 8 hour treatment.

The stability of the present compositions compares favorably with faujasites which have been totally exchanged with rare earth metal cations. The present compositions also show an exceptionally high degree of activity and selectivity for the formation of high octane gasoline components when used as catalytic cracking catalyst promoters. The precise reason why the present compositions exhibit such a desirable degree of stability and catalytic activity is not entirely understood; however, it is believed that the small amount of transition metal ion adds considerably to the catalytic activity of the faujasite type zeolite. Furthermore, it is believed by using the present novel technique the transition metal ions as well as the rare earth ions are inserted into the faujasite structure at points wherein maximum degree of thermal stabilizing effect and catalytic enhancing effect is obtained. The amount and location of a significant number of acid units in the zeolite probably contributes to its high catalytic activity. It is also found that by using the present novel technique wherein the metal ions are exchanged in the faujasite at a pH of from about 2 to 4, very little, if any, extraction of alumina from the faujasite structure occurs. Hence, it is found that the present products will retain the silica to alumina ratio possessed by the initial alkali metal faujasite used in preparing these products.

To form a catalyst composition from the presently disclosed novel mixed rare earth-transition metal faujasites, conventional catalytic preparation procedures may be utilized. For example, the present faujasites may be incorporated into a conventional silica, alumina-clay cracking catalyst composition by admixing the faujasite with the catalyst components at any point during preparation of the catalyst. Typical catalyst matrix components which may be used to prepare the catalyst compositions comprise silica, alumina, silica-alumina, clay and admixtures thereof. Preferably it is found that where a synthetic amorphous silica-alumina is used in the preparation of the catalyst, the silica-alumina will contain from about 13 to 30% by weight alumina. When clay is used as an additive, it is found that from about 20 to 50% by weight clay based on the total weight of the catalyst composition will give desired results. In general, it is found that when the present novel faujasites are used as catalysts promoters, from about 5 to about 50% by weight of the promoter is incorporated in the catalyst composition.

In a typical procedure for preparing a catalyst composition aqueous sodium silicate solution is first gelled with a mineral acid or carbon dioxide to produce a silica slurry. The silica slurry may then be combined with an aluminum salt such as aluminum sulfate in amounts required to add the desired amount of alumina to the composition. The silica-alumina slurry may then be combined with the present novel faujasite promoter, and if desired, clay may be added in desired amounts. The slurry is then filtered and washed to remove soluble impurities such as sodium and sulfate ions. Subsequently, the catalyst composite may be spray dried or pelletized and further washed and/or ion exchanged to remove residual sodium ions.

The catalyst prepared using the present faujasite promoter are found to be particularly effective in the catalytic cracking of hydrocarbons wherein a heavy feedstock is subjected to cracking conditions at a temperature on the order of 800° to 1000°F. It is found that the present catalyst will selectively form substantial yields of high octane non-leaded gasoline and olefins while producing only small amounts of undesirable coke and dry gases. The present zeolite promoter, when subjected to both catalytic cracking conditions and the more rigorous catalyst regeneration conditions wherein coke is burned off the surface of the catalyst at temperatures on the order of 1700° to 1800°F. in the presence of steam, is found to retain a high degree of its original crystallinity and surface area.

Having described the basic aspects of the present invention, the following examples are given to illustrate specific embodiments thereof.

EXAMPLE I

I. A series of mixed rare earth-chromium faujasite zeolites were prepared with different rare earth and chromium ion contents to form a series of compositions identified as A, B, C, D, and E below.

A. 100 gram dry basis sample of commercial NaY sieve having a silica alumina ratio of about 5.2 was slurried in 150 ml. of water. 9.2 g chromium chloride ($CrCl_3 \cdot 6H_2O$) was dissolved separately in 200 ml. of water and 46 ml. of a commercial 60 weight percent rare earth chloride solution was added. The prepared sieve-water slurry was blended with the mixed rare earth-chromium chloride solution with stirring. The resultant mixture possessed a 3.5 pH. The solution was heated to 195°F. and maintained at that temperature with stirring for 45 minutes. The exchanged sieve was then filtered, washed chloride free, and dried at 220°F. for 1 hour. The resultant product, which was a greenish filter cake, was calcined at 1000°F. for 3 hours and finally treated twice with ammonium sulfate solution. The first treatment was conducted with 1000 ml. of 10% ammonium sulfate solution for 1 hour at boiling. The composition and thermal stability data for this material (Sample A) are given in Table I below. It was observed that part of the chromium ions in the zeolite were removed from the sieve during the subsequent ammonium sulfate solution treatment.

B. The procedure of paragraph A. above was repeated, however, 23.2 grams of chromium chloride was used in the exchange solution. The pH of the sieve-metal chloride mixture was adjusted to 3.5 with dilute hydrochloric acid before carrying out the exchange. Composition and thermal stability data for this material (Sample B.) is given in Table I below.

C. The procedure of paragraph A. was repeated, however, the chromium chloride used in the exchange solution was 4.64 grams. The pH of the exchange mixture was adjusted to 3.5 using hydrochloric acid before starting the exchange. The composition and thermal stability data for this material (Sample C) are given in Table I below.

D. An exchange solution was prepared by dissolving 2.33 grams of chromium chloride in 150 ml. of water and adding thereto 11.5 ml. of a 60% rare earth chloride solution. A 25 gram dry basis sample of a partially ammonia exchanged sodium sieve containing 2.4 percent $Na_2O$ and having a silica alumina ratio of about 5.2 was blended with the metal chloride exchange solution. The slurry was boiled for 45 minutes, filtered, washed chloride free, dried and calcined at 1000°F. for 3 hours. The calcined material was then ammonium sulfate treated twice as explained in paragraph A. The composition and stability data for this material (Sample D) are given in Table I.

E. To illustrate the effect of calcination conditions upon the compositions prepared by way of Sample A, the procedure of paragraph A. was repeated, however, the calcination was conducted under vacuum. Composition and stability data for this material (Sample E) is given in Table I below.

The difference is due to the partial loss of chromate ions during the ammonium exchange. It is also noted that the rare earth content of the air calcined sample is slightly lower. It should be noted that the low rare earth and chromium content of these sieves suggests the presence of a considerable number of acid sites.

II. To illustrate the catalytic activity of the promoters of the present invention samples of faujasite prepared by way of the paragraphs A., B. and E. were combined with a semi-synthetic matrix at levels of 10 or 15% by weight. For comparison, similar samples were prepared using a conventional calcined rare earth Type Y faujasite which contained 18% by weight rare earth (Sample CREY). The Samples were combined with a silica alumina clay matrix which comprised 40% by weight kaolin and 60% by weight synthetic silica alumina mixture, having alumina content of 25 and 75% by weight silica. The samples were pelletized and were subjected to a standard microactivity cracking test. The obtained results ae shown in Table II. In Table III similar data was obtained subsequent to steaming the catalyst at 1350°F. for 8 hours prior to testing.

The test conditions and procedures used herein are fully described by Ciapetta and Henderson, Oil and Gas Journal, Oct. 16, 1967. The feedstock was West Texas Devonian gas oil using a temperature of 800°F. and 16 weight hours space velocity.

Table II

Micro-activity of Cr-RE-Y Promoted Catalysts (Fresh Catalysts)

Tested Catalyst: Blend of 10 wt.% sieve in semi-synthetic matrix.
Thermal Pretreatment of Promoter: Calcination at 1000°F. for 3 hours.
Feed Stock: West Texas Devonian Gas Oil
Test Conditions: 800°F., 16 WHSV

| Sample | A | B | E | CREY |
|---|---|---|---|---|
| Conversion, V% | 83.8 | 79.9 | 79.4 | 79.8 |
| $H_2$, W% | 0.095 | 0.091 | 0.074 | 0.086 |
| $C_1 + C_2$, W% | 1.280 | 1.167 | 1.210 | 1.298 |
| Dry Gas, W% | 7.94 | 6.98 | 7.28 | 8.31 |
| $C_3^=$, V% | 3.44 | 3.83 | 3.69 | 3.43 |
| $C_3$ Tot., V% | 11.05 | 9.61 | 10.09 | 11.67 |
| $C_3^=$/Tot. $C_3$, V/V | 0.31 | 0.40 | 0.37 | 0.29 |
| $C_4^=$, V% | 1.46 | 1.59 | 1.28 | 1.32 |
| $C_4$ Tot., V% | 20.66 | 17.58 | 17.83 | 21.05 |
| $C_4^=$/ Tot. $C_4$, V/V | 0.07 | 0.09 | 0.07 | 0.06 |
| $C_5^+$ Gaso., V% | 59.89 | 59.07 | 57.94 | 52.00 |
| $C_5^+$ Gaso./Conv., V/V | 0.71 | 0.74 | 0.73 | 0.65 |
| $C_4^+$ Gaso., V% | 80.55 | 76.65 | 75.76 | 73.26 |
| $C_4^+$ Gaso./Conv., V/V | 0.96 | 0.96 | 0.95 | 0.92 |
| Coke on Cat., W% | 1.95 | 1.85 | 1.95 | 2.40 |
| Coke on Feed, W% | 10.82 | 10.52 | 10.91 | 13.99 |
| $C_5^+$ Gaso./Coke, V/W | 5.53 | 5.62 | 5.31 | 3.72 |
| Conv./Coke, V/W | 7.75 | 7.60 | 7.28 | 5.70 |

Table I

Composition and Stability Data for Cr-RE-Y Sieves

| | Starting Sieve | Calc. Cond. | % $Na_2O$ Before $NH_4$ Exch. | % $Na_2O$ After $NH_4$ Exch. | % $Cr_2O_3$ After $NH_4$ Exch. | % $RE_2O_3$ After $NH_4$ Exch. | Thermal Profile S.A. ($m^2/g$) After 2 hrs 1000 | 1600 |
|---|---|---|---|---|---|---|---|---|
| A | NaY | air | 2.98 | 0.24 | 1.14 | 7.05 | 838 | 622 |
| B | NaY | air | 2.77 | 0.24 | 1.96 | 4.68 | 775 | 549 |
| C | NaY | air | 2.90 | 0.20 | 0.87 | 8.86 | 733 | 641 |
| D | ($NH_4$, Na)X | air | 1.44 | 0.31 | 2.00 | 16.02 | 613 | 98 |
| E | NaY | vac. | 2.98 | 0.36 | 1.50 | 7.88 | 727 | 675 |

Referring to the above table, it can be seen that by comparing samples A. and E., the chromium content of the air calcined sample is slightly lower than that of the vacuum calcined sample E: 1.14 v. 1.50 percent $Cr_2O_3$.

In Table III below, the results of a microactivity test are summarized wherein prior to testing the catalyst was treated with steam at 1350°F. for 8 hours using 15 psi steam. The feedstock was West Texas Devonian Gas Oil. A temperature of 900°F. was used with a 16 weight hour space velocity.

Table III

Micro-Activity of Cr-RE-Y Promoted Catalysts
(After Steaming)
Tested Catalyst: Blend of 10 or 15 wt.% sieve in semi-synthetic matrix.
Thermal Pretreatment: Steaming at 1350°F. for 8 hours, 15 psi (Steam)
Feed Stock: West Texas Devonian Gas Oil
Test Conditions: 900°F, 16 WHSV

| Sample | A | A | B | E | CREY |
|---|---|---|---|---|---|
| Promoter in Cat., W% | 10 | 15 | 15 | 15 | 15 |
| Conv., V% | 70.2 | 75.9 | 69.6 | 76.5 | 76 |
| $H_2$, W% | 0.052 | 0.039 | 0.028 | 0.024 | 0.023 |
| $C_1 + C_2$, W% | 0.708 | 1.006 | 0.852 | 0.048 | 1.491 |
| Dry Gas, W% | 5.19 | 5.88 | 5.49 | 6.15 | 7.16 |
| $C_3$, V% | 6.23 | 6.57 | 6.39 | 6.43 | 6.58 |
| $C_3$ Tot., V% | 7.36 | 8.04 | 7.66 | 8.44 | 9.41 |
| $C_3$/Tot. $C_3$, V/V | 0.85 | 0.82 | 0.83 | 0.76 | 0.70 |
| $C_4$, V% | 4.24 | 3.63 | 4.34 | 3.79 | 2.54 |
| $C_4$ Tot., V% | 10.97 | 10.96 | 11.51 | 11.99 | 12.13 |
| $C_4$/Tot. $C_4$, V/V | 0.39 | 0.33 | 0.38 | 0.32 | 0.21 |
| $C_5^+$, Gaso., V% | 63.99 | 67.56 | 60.91 | 68.41 | 65.89 |
| $C_5^+$, Gaso./Conv., V/V | 0.91 | 0.89 | 0.88 | 0.89 | 0.87 |
| $C_4^+$, Gaso., V% | 74.95 | 78.53 | 72.42 | 80.40 | 78.02 |
| $C_4^+$, Gaso./Conv. V/V | 1.07 | 1.03 | 1.04 | 1.05 | 1.03 |
| Coke on Cat., W% | 0.28 | 0.30 | 0.40 | 0.30 | 0.60 |
| Coke on Feed, W% | 1.64 | 1.76 | 2.31 | 1.74 | 3.47 |
| $C_5^+$, Gaso.,Coke V/W | 39.01 | 38.44 | 26.38 | 39.24 | 18.97 |
| Conv./Coke, V/W | 42.83 | 43.20 | 30.13 | 43.88 | 21.88 |

In Table II above it is seen that the Cr—RE—Y promoted catalysts of the present invention illustrate high conversion values and very good $C_5+$ gasoline selectivity both for air and vacuum calcined sieves. The conversion is better, or equal to that obtained using the conventional CREY promoted sieves and the $C_5+$ gasoline selectivity is up to 8 volume percent higher for Cr—RE—Y containing catalysts. The yield of olefins is higher for the catalysts prepared using Cr—RE—Y faujasite. Furthermore, it is noted that the coke selectivity is far superior for the present catalyst.

In the data of Table III it is seen that the catalyst prepared in accordance with the present invention possess similar or greater gasoline selectivity that the conventional CREY promoted catalyst. Furthermore, the yield in dry gas is substantially lower and the yield of olefins is higher. The $C_5+$ gasoline/coke and conversion/coke ratios are twice as high as the corresponding ratios obtained with the conventional CREY promoted catalyst.

EXAMPLE II

Preparation and Properties of Mixed Rare Earth-Iron Exchanged Faujasite Type Sieves (RE—Fe—Y Sieves)

To illustrate the effect of the total rare earth and iron content of the rare earth/iron ratio and of the nature of the starting material upon the properties of the resulting RE—Fe—Y sieves, a series of sieves was prepared under different conditions and their properties investigated. For the exchange we used commercial rare earth chloride solutions (60 wt.%) and iron (II) sulfate solutions. Other iron (II) salts can also be used.

A. Preparation From NaY (one step exchange)

1. In a typical example, 25 g. (dry basis) of thoroughly washed, commercially available NaY sieve having a silica to alumina ratio of 5.3 was slurried in 100 ml. of water. 2.5 g. ferrous sulfate ($FeSO_4 \cdot 7H_2O$) was dissolved separately in 100 ml. of water, after addition of 2-3 drops of diluted sulfuric acid (1:2) to facilitate the dissolution; the hazy ferrous sulfate solution was filtered. A rare earth chloride solution was made up from 11.5 ml. of commercial 60 wt.% rare earth chloride solution diluted with 50 ml. of water. The resulting rare earth chloride solution was mixed with the ferrous sulfate. The NaY slurry was then blended into the rare earth-iron salt solution with stirring. The pH of the resulting slurry was adjusted to 3.5 with diluted sulfuric acid. The slurry was heated and kept boiling under reflux, with stirring, for 45 minutes. The exchanged sieve was filtered, washed first with 200 ml. of water acidified to the same pH as the filtrate ( 3.6), then washed with pure water until chloride and sulfate free, and dried at 220°F. for 1 hour.

The resulting cake was calcined at 1000°F. for 3 hours in a muffle furnace and finally ammonium sulfate treated twice with 500 ml. of a 10% ammonium sulfate solution, for one hour at boiling each. Composition and thermal stability data for the material obtained are given in Table I (see Sample A-1).

2. In this example a RE—Fe—Y sieve was prepared by the same procedure as Sample 1, the only difference being the use of 5 g. ferrous sulfate and 11.5 ml. of 60% rare earth chloride solution in the exchange solution. Composition and thermal data for the obtained material are shown in Table I (see Sample A-2).

3. Another Re—Fe—Y sieve was prepared by the procedure described for Sample 1, except for the use of 13 g. of ferrous sulfate and 8 ml. of 60% rare earth chloride solution in the exchange process. Composition and thermal stability data for this material are given in Table I (see Sample A-3).

4. A RE—Fe—Y sieve was prepared by the procedure described for Sample 1, except for the use of 5 g. of ferrous sulfate and 9 ml. of 60% rare earth chloride solution in the exchange process. Composition and stability data are given in Table I (see Sample A-4).

5. Another sample was prepared by the same procedure, only using 10 g. of ferrous sulfate and 8 ml. of rare earth chloride solution for the exchange. Composition and stability data are given in Table I (see Sample A-5).

6. Another RE—Fe—Y sieve was prepared by the procedure described for Sample 1, except for the use of 5 g. of ferrous sulfate and 7.5 ml. of 60% rare earth chloride solution. Composition and stability data are given in Table I (see Sample A-6).

7. Applying the same procedure, a RE—Fe—Y sieve was prepared by using 7.5 g. of ferrous sulfate and 7.5 ml of rare earth chloride solution. Composition and stability data are given in Table I (see Sample A-7).

8. In another example, ferric chloride was used in the mixed rare earth-iron solution for the exchange. 25 g. (dry basis) of commercial NaY sieve was slurried in 75 ml. of water. Separately, 5 g. of ferric chloride ($FeCl_3 \cdot 6H_2O$) was dissolved in 50 ml. of water, after 3-4 drops of hydrochloric acid was added. Another solution was prepared by diluting 11.5 ml. of commercial (60 wt.%) rare earth chloride solution with 15 ml. of water.

The rare earth and ferric chloride solutions were mixed together, and the NaY slurry was then blended into the mixed solution. The pH of the resulting slurry was adjusted to 3.0 and heated at 90°C. for 1 hour under stirring. After the exchange, the solution was filtered and the cake was washed first with acidified water (with the same pH as the filtrate), then with deionized water and dried at 220°F. for 1 hour. The sieve was then calcined and ammonium salt treated as described for example A-1. Composition and thermal data for the resulting material are shown in Table I (see Sample A-8).

9. Another RE—Fe—Y sieve was prepared in the same way as described for sample A-8, the only difference being the use of 5 g. ferric chloride and 9 ml. of rare earth chloride. For composition and stability data, see sample A-9, Table I.

10. Another RE—Fe—Y sieve was prepared by the same method, except for using 4 g. of ferric chloride and 7.5 ml. of rare earth chloride. Composition and stability data are given in Table I (see Sample A-10).

RE—Fe—Y sieves can also be prepared by consecutive exchange of NaY sieves having a silica to alumina ratio of 3 to 6 with rare earth and then with iron (II) salts. Following the rare earth exchange, the sieve is usually calcined in order to stabilize the rare earth ions in the zeolite. The calcined material can be directly exchanged with ferrous ions. Another procedure is to treat the rare earth exchanged sieve first with ammonium salts to remove the remaining sodium ions, and then to carry out the iron exchange. In either case most of the sodium ions should be removed (to 0.2–0.3% $Na_2O$ or less) in order to obtain a zeolite with good steam stability and high catalytic activity. The preparation of RE—Fe—Y sieves by this procedure is described in the following examples.

1. In a typical example, 100 g. (dry basis) NaY sieve was slurried in 150 ml. of water, and then blended into a solution obtained from 46 ml. of a 60% commercial rare earth chloride solution diluted with 200 ml. of water. The pH of the resulting slurry was adjusted to 3.5 with diluted hydrochloric acid, and refluxed with boiling for 45 minutes. The rare earth exchanged sieve was filtered, and washed chloride free.

The resulting cake was activated at 1000°F. for 2 hours in a muffle furnace and then ammonium sulfate treated twice, first with 1000 ml. and then with 2000 ml. of a 10% ammonium sulfate solution, for one hour at boiling each. The RE—$NH_4$—Y sieve was finally washed sulfate free and dried at 220°F. for 1 hour.

To obtain the RE—Fe—Y sieve, 25 g. (dry basis) of RE—$NH_4$—Y was slurried in 75 ml. of water, and added to a solution of 0.75 g. of ferrous sulfate dissolved in 50 ml. of water. After adjusting the pH to 3.5, the slurry was refluxed with boiling for 45 minutes, filtered and washed sulfate free. Composition and stability data for the resulting material are given in Table Table I Composition, Thermal and Steam Stability Data For Re-Fe-Y Sieves (one step exchange)
Starting Material: commercial NaY sieve
Exchange Solutions: mixed rare earth chloride and ferrous sulfate

| Sample No. | Chemical Composition | | | Thermal Profile (SA in $m^2/g$ at °F-2hrs) | | | Steam Stability 1500°-3 hrs 100% steam Std.=100(*) |
|---|---|---|---|---|---|---|---|
| | %$RE_2O_3$ | %$Fe_2O_3$ | %$Na_2O$ | 1000 | 1600 | 1650 | |
| A-1 | 12.10 | 0.21 | 0.22 | 850 | 710 | 690 | 105 |
| A-2 | 14.10 | 0.68 | 0.18 | 765 | 694 | 665 | 99 |
| A-3 | 10.5 | 0.48 | 0.16 | 790 | 663 | 655 | 95 |
| A-4 | 12.95 | 1.17 | 0.26 | 715 | 678 | 676 | 80 |
| A-5 | 8.57 | 0.24 | 0.20 | 739 | 669 | 645 | 81 |
| A-6 | 12.55 | 1.95 | 0.16 | 790 | 603 | 785 | 79 |
| A-7 | 10.80 | 2.17 | 0.33 | 809 | 780 | 645 | 68 |
| A-8 | 11.82 | 1.35 | 0.14 | 800 | 488 | 475 | 52 |
| A-9 | 10.78 | 1.65 | 0.13 | 770 | 424 | 388 | 38 |
| A-10 | 11.28 | 2.33 | 0.12 | 792 | 395 | 70 | 10 |
| Standard | 17.9 | — | 0.06 | 865 | 735 | 689 | 100 |

(*)"Standard" is a rare earth exchanged Y sieve. Steam stabilities are measured by surface area retention relative to the Standard.

The data given in Table I indicates that the stability (specifically the steam stability) of RE—Fe—Y sieves generally increases with their rare earth content and decreases with increasing iron content. This is exemplified by samples 1 and 5, where for almost equal iron content, the sample with higher rare earth content has higher stability.

Samples A-1 and A-6, having a similar rare earth content show that the sample richer in iron has lower stability.

B. Preparation From NaY (two step exchange)

II (see Sample B-1).

2. Another RE—Fe—Y sieve was prepared by the same procedure, except for the use of 1.25 g. ferrous sulfate for the iron exchange. Composition and stability data are given in Table II (see Sample B-2).

3. In another example, a RE—Fe—Y sieve was prepared by the same procedure as Sample B-1, except for using 1.75 g. of ferrous sulfate for the iron exchange. Composition and stability data are given in Table II (see Sample B-3).

Table II

Composition, Thermal and Steam Stability Data For RE-Fe-Y Sieves (consecutive exchanges)

Starting Material: commercial NaY sieve
Exchange Solutions: rare earth chloride; ammonium sulfate; ferrous sulfate

| Sample No. | Chemical Composition | | | Thermal Profile (SA in m²/g at °F—2 hrs) | | | | Steam Stability 1500° — 3 hrs 100% steam Std. B=100 |
|---|---|---|---|---|---|---|---|---|
| | %RE₂O₃ | %Fe₂O₃ | %Na₂O | 1000 | 1600 | 1650 | 1700 | |
| B-1 | 12.50 | 0.76 | 0.30 | 804 | 744 | 443 | <10 | 99 |
| B-2 | 12.60 | 1.13 | 0.30 | 808 | 734 | 347 | <10 | 82 |
| B-3 | 12.80 | 1.45 | 0.28 | 803 | 720 | 230 | <10 | 63 |

As shown in Table II above, the stability data for the RE—Fe—Y sieves prepared by consecutive exchanges indicate a decrease in thermal and steam stability with increasing iron content of the sieve. This trend is clearly seen in the decline of the SA after steaming as well as of the surface area at 1650°F., with increasing iron content.

C. Preparation From PCY

A series of RE—Fe—Y sieves was prepared from PCY, a material already containing rare earth ions. The PCY sieve was prepared by ammonium exchanging commercially available NaY sieve having a silica to alumina ratio of 5.3 to approx. 3% Na₂O, and then rare earth exchanging the resulting cake. The PCY sieve, containing approx. 6% RE₂O₃, was calcined at 1000°F. for 3 hours and ammonium sulfate exchange to 0.2% Na₂O. The resulting material was then exchanged with variable amounts of ferrous sulfate at pH 3.5.

1. In a typical example, 30 g. dry basis of ammonium exchanged PCY was slurried in 90 ml. of water. 0.75 g. of ferrous sulfate was dissolved in 30 ml. of water, after adding 3 drops of diluted sulfuric acid (1:2); the solution was filtered. The sieve slurry was blended into the ferrous sulfate solution and the pH of the resulting slurry was adjusted to 3.5 with diluted sulfuric acid. After refluxing at boiling for one hour, the sieve was filtered, washed sulfate free and dried at 220°F. for 1 hour. Composition and stability data are given in Table III (see Sample C-1).

2. Another RE—Fe—Y sieve was prepared by the same procedure, except for using 1.25 g. of ferrous sulfate. Composition and stability data are given in Table III (see Sample C-2).

3. In another example, a RE—Fe—Y sieve was prepared by the same procedure as Sample C-2, except for using 2.5 g. of ferrous sulfate. Composition and stability data are given in Table III (see Sample C-3).

4. A RE—Fe—Y sieve was prepared from PCY by the procedure described for Sample C-1, the only difference being the use of 7.5 g. of ferrous sulfate. For composition and stability data see Table III (Sample C-4).

Table III

Composition, Thermal and Steam Stability Data For RE-Fe-Y Sieves From PCY

Starting Material: ammonium exchanged PCY sieve
Exchange Solution: ferrous sulfate

| Sample No. | Chemical Composition | | | Thermal Profile (SA at °F — 2 hrs) | | | | Steam Stability 1500° — 3 hrs 100% steam Std. = 100 |
|---|---|---|---|---|---|---|---|---|
| | %RE₂O₃ | %Fe₂O₃ | %Na₂O | 1000 | 1600 | 1650 | 1700 | |
| C-1 | 5.86 | 0.51 | 0.15 | 815 | 670 | 645 | <10 | 92 |
| C-2 | 5.82 | 0.88 | 0.15 | 804 | 655 | 507 | <10 | 87 |
| C-3 | 5.85 | 1.53 | 0.21 | 795 | 644 | 231 | <10 | 77 |
| C-4 | 5.70 | 2.81 | 0.19 | 783 | 630 | <10 | <10 | 62 |

The thermal and steam stability data of Table III for RE—Fe—Y sieves obtained from PCY clearly indicate that for a practically constant rare earth level, the stability of the sieves decreases with increasing iron content. Compared to sieves from the A and B series with a similar iron content, the RE—Fe—Y sieves from PCY have a lower stability due to a lower rare earth content.

II. Catalytic Evaluation of RE—Fe—Y Sieves in Petroleum Cracking

To illustrate the catalytic activity of RE—Fe—Y sieves, examples are given for the use of these sieves as promoters in petroleum cracking catalysts. The tests were carried out on a micro-activity unit. Both fresh and steam deactivated catalysts were tested. Results obtained for fresh catalysts are given in Table IV, and those obtained for steam deactivated catalysts are shown in Table V. These results are compared to those of a Standard, containing a commercial rare earth Y sieve.

A. Activity of Fresh Catalysts

Table IV

Micro-Activity Data for RE-Fe-Y Promoted Catalysts (fresh)

Thermal Pretreatment: 1000°F — 3 hrs.
Test Conditions: 10 wt.% blend in semi-synthetic matrix series "C"(*); 800° /16 WHSV; WTDGO(**)

| Sample Type | RE-Fe-Y | RE-Fe-Y | RE-Y (Standard) |
|---|---|---|---|
| Sample No. | 1 | 2 | 3 |
| Composition prom. | | (A-1) | |
| %RE₂O₃ | 11.75 | 12.10 | 17.9 |
| %Fe₂O₃ | 0.30 | 0.21 | — |
| %Na₂O | 0.14 | 0.22 | 0.06 |
| SA (1650°—2 hrs) | 675 | 690 | 689 |
| Steam Stab. (% Std.) | 102 | 105 | 100 |
| Conversion, V% | 81 | 79 | 82 |
| H₂, W% | 0.09 | 0.10 | 0.08 |
| C₃⁼, V% | 3.1 | 3.2 | 2.7 |
| C₃ tot., V% | 10.6 | 11.7 | 10.0 |
| C₄⁼, V% | 1.9 | 1.7 | 1.5 |
| i-C₄, V% | 15.5 | 17.0 | 15.5 |

Table IV-continued

Micro-Activity Data for RE-Fe-Y Promoted Catalysts (fresh)

Thermal Pretreatment: 1000°F — 3 hrs.
Test Conditions: 10 wt.% blend in semi-synthetic matrix series "C"(*); 800°/16 WHSV; WTDGO(**)

| Sample Type | RE-Fe-Y | RE-Fe-Y | RE-Y (Standard) |
|---|---|---|---|
| Sample No. | 1 | 2 (A-1) | 3 |
| Composition prom. | | | |
| $C_4$ tot., V% | 20.8 | 22.6 | 20.4 |
| $C_5^+$ gaso., V% | 53.5 | 57.6 | 53.7 |
| $C_4^+$ gaso., V% | 74.3 | 80.2 | 74.1 |
| C on cat., W% | 2.1 | 0.65 | 2.1 |
| C on feed, W% | 11.9 | 3.8 | 12.4 |
| $C_5^+$ gaso./conv., V/V | 0.66 | 1.0 | 0.66 |
| $C_5^+$ gaso./coke, V/W | 4.5 | 15.2 | 4.3 |
| Conv./coke, V/W | 6.8 | 20.9 | 6.6 |

(*)Series "C" is a semi-synthetic matrix made up from 40 wt% kaolin and 60 wt% synthetic silica-alumina mixture. The silica-alumina mixture consists of 75 wt% $SiO_2$ and 25 wt% $Al_2O_3$.
(**)West Texas Devonian Gas Oil, 500–800°F cut.

The data in Table IV show that fresh RE—Fe—Y promoted catalysts have high conversion values and very good $C_5+$ gasoline selectivity. The conversion obtained with the tested RE—Fe—Y sieves is very similar to that of the Standard (81 and 79 vs. 82% conversion). The $C_5+$ gasoline selectivity is as good or better than that of the Standard (53.5 and 57.6 vs. 53.7% $C_5+$ gasoline). The yield in $C_3$ olefins, $C_4$ olefins and i-$C_4$ hydrocarbons is slightly higher for the RE—Fe—Y sieves.

B. Activity of Steam Treated Catalysts

Table V

Micro-Activity Data For RE-Fe-Y Promoted Catalysts (Steam Deactivated at 1350°F. for 8 hrs)

Test Conditions: 10 wt% blend in semi-synthetic matrix series "C"; 900°/16 WHSV; WTDGO

| Sample Type | RE-Fe-Y | RE-Fe-Y | RE-Fe-Y | RE-Y |
|---|---|---|---|---|
| Sample No. | 1 (A-3) | 2 (Sample 1 Table IV) | 3 (A-4) | 4 (Standard) |
| Composition prom. | | | | |
| %$RE_2O_3$ | 10.5 | 11.75 | 12.95 | 17.9 |
| %$Fe_2O_3$ | 0.48 | 0.30 | 1.17 | — |
| %$Na_2O$ | 0.16 | 0.14 | 0.36 | 0.06 |
| SA (1650°—2 hrs) | 582 | 675 | 698 | 689 |
| Steam Stab. (% Std) | 95 | 102 | 85 | 100 |
| Conversion, V% | 69 | 68 | 71 | 69 |
| $H_2$, W% | 0.03 | 0.06 | 0.03 | 0.03 |
| $C_3$, V% | 6.1 | 5.4 | 6.8 | 5.3 |
| $C_3$ tot., V% | 7.7 | 6.7 | 8.1 | 6.5 |
| $C_4^=$, V% | 4.4 | 3.6 | 4.0 | 3.3 |
| i-$C_4$, V% | 7.6 | 6.6 | 7.8 | 6.1 |
| $C_4$ tot., V% | 13.3 | 11.4 | 13.3 | 10.5 |
| $C_5^+$ gaso., V% | 56.9 | 57.6 | 59.8 | 58.9 |
| $C_4^+$ gaso., V% | 70.2 | 69.0 | 73.0 | 69.5 |
| C on cat., W% | 0.42 | 0.42 | 0.21 | 0.43 |
| C on feed, W% | 2.4 | 2.4 | 1.21 | 2.5 |
| $C_5^+$ gaso./conv., V/V | 0.82 | 0.84 | 0.84 | 0.85 |
| $C_5^+$ gaso./coke, V/W | 23.3 | 23.7 | 49.2 | 23.1 |
| Conv./coke, V/W | 28.5 | 28.1 | 58.5 | 27.1 |

The catalytic activity of several steam deactivated RE—Fe—Y sieves is illustrated in Table V. The results obtained for the three sieves tested show high activity and gasoline selectivity as compared to the Standard.

Conversion. The conversion values for the samples tested are within limits of error identical to that of the Standard (69, 68 and 71 vs. 69%).

$C_5^+$ gasoline. The yield in $C_5^+$ gasoline of the RE—Fe—Y sieves is similar to that of the Standard (56.9, 57.6 and 59.8 vs. 58.9%). Generally it increases with increasing rare earth content. The yield in $C_4^+$ gasoline is also similar or higher than that obtained with the Standard.

$C_3$ + $C_4$ Olefins. All the RE—Fe—Y sieves tested gave higher yields in $C_3$ and $C_4$ olefins than Standard: 6.1, 5.4 and 6.8 vs. 5.3% $C_3^=$; 4.4, 3.6 and 4.0 vs. 3.3% $C_4^=$.

i-$C_4$ hydrocarbons. The yield in i-$C_4$ hydrocarbons is also higher for RE—Fe—Y sieves (7.6, 6.6 and 7.8 vs. 6.1% i-$C_4$). Higher yields in i-$C_4$ hydrocarbons are important, due to their contribution to higher octane numbers of the gasoline fraction.

Coke. The coke selectivity of the tested materials is similar or better than that of Standard: 2.4, 2.4 and 1.2 vs. 2.5% coke on feed. Especially sample A-4 shows an unusually high coke selectivity.

The reduced rare earth usage, the simple preparation technique and the excellent catalytic performance of the RE—Fe—Y sieves makes then superior to most commercial promoters used in petroleum cracking catalysts.

The above examples clearly illustrate that a superior catalyst composition may be obtained using the novel mixed rare earth-transition metal exchanged faujasite of the present invention.

EXAMPLE 3

This example illusrates the critically of utilizing the pH of 2 to 4 in the preparation of the rear earth zeolites exchanged with iron or chromium.

Chromium exchanged faujasite was prepared by washing 25 g. (dry basis) of a commercially available Type Y molecular sieve in the sodium form by stirring the molecular sieve in 40 ml. of water. A chromium chloride solution was prepared by dissolving 2.3 g. of ($CrCl_3.6H_2O$) in 50 ml. of water. A rare earth chloride solution was prepared to contain 60% rare earth chloride and 11.5 ml. of this solution was added to the chromium chloride solution. The zeolite slurry was then blended into the mixed rare earth-chromium chloride solution with stirring. The pH of the resulting slurry was adjusted to 3.5 in Sample 1 and to 6.0 in Sample 2 using dilute solutions of ammonium hydroxide or hydrochloric acid. The mixture was then heated to about 90°C for 45 min. with stirring. After the exchange was completed the slurry was filtered, washed chloride free and dried at 110°C for 1 hr. The resulting greenish cake was then calcined in a muffle furnace at 540°C for 3 hours. It was then treated twice with 500 ml of a 10% ammonium sulfate solution. The ammonium sulfate treatment was carried out by heating the zeolite for 1 hour at the boiling point. At the end of this time the material was filtered, washed sulfate free and dried at 110°C for 1 hour.

The stability of the rare earth chromium Y samples was evaluated by comparing their surface area retention with a standard consisting of a calcined rare earth Type Y molecular sieve having a soda content of less than 1%. Sample 1 prepared at a pH of 3.5 had a surface area retention essentially identical with that of the standard (540 m²/g). The sample exchanged at a pH of 6.0 had a surface area of only 80% of that of the standard.

It is obvious in these data that the rare earth chromium Y samples prepared at an exchange pH 3.5 had a higher thermal stability than the sample prepared by exchange at a pH of 6.0.

The samples prepared above, Sample 1 that was exchanged at a pH of 3.5 and Sample 2 exchanged at a pH of 6, were evaluated for catalaytic activity and selectivity using the following technique.

The rare earth chromium Y samples were steamed at a temperature of 815°C using the techniques described previously and were blended into a semi-synthetic matrix that had previously been steam calcined at 730°C for 8 hours under a steam pressure of 15 p.s.i. The blends contained 10 wt.% zeolite. The obtained catalysts were pilled and then tested for gas oil cracking activity in a microreactor at a temperature of 480°C, a catalyst/oil ratio of 5.5 and a 16 WHSV. The feed was a West Texas gas oil. The catalyst containing the rare earth-chromium Y prepared at a pH of 3.5 gave a conversion of 80%, whereas the rare earth chromium Y catalyst that was exchange at a pH 6.0 gave a conversion of 76%.

EXAMPLE 4

In this example a rare earth iron samples were prepared in an exchange at a pH of 3.0 and 6.0.

The samples are prepared essentially in the same manner as described in Example 3 except that 3 g. of iron (III) chloride (FeCl$_3$.6H$_2$O) was used in the exchange process. The exchanges were carried out at a pH of 3 and a pH of 6 respectively. The rare earth iron Y samples were steamed at 850°C using the technique described previously. The sample prepared at an exchange pH of 3.0 retained a surface area of 475 m²/g, whereas the one exchanged at a pH of 6.0 had a surface area of only 428 m²/g. The sample exchanged at a pH of 3.0 thus showed a higher steam stability than the one exchanged at a pH of 6.0.

Catalytic evaluation of these materials showed that the sample exchanged at a pH 3.0 gave a conversion of 72%, whereas the sample exchanged at a pH of 6.0 gave a conversion of 68%.

We claim:
1. A method for preparing the catalytically active faujasite which contains 0.2 to 3% by weight transition metal ions calculated as

$$M_{\frac{2}{n}}O$$

wherein M is a transition metal ion selected from the group consisting of Cr, Fe and mixtures thereof, and $n$ is the valence of M, and 2 to 15% by weight rare earth ions calculated as RE$_2$O$_3$ which comprises:
  a. exchanging sodium faujasite with a mixture of chromium and rare earth ions in aqueous solution, said solution having a pH of 2 to 4 and from about 0.01 to 0.2 moles transition metal ions per liter and from 0.1 to 0.4 RE ions per liter; and
  b. calcining said exchanged faujasite at a temperature of 600° to 1500°F.

2. The process of claim 1 wherein said calcined faujasite is washed to lower the Na$_2$O content thereof to from about 0.05 to 3.0% by weight.

3. The method of claim 1 wherein said exchange is conducted at a temperature of 80° to 105°C.

4. The method of claim 1 wherein said faujasite is washed with ammonium sulfate.

5. The method of claim 1 wherein said rare earth and transition metal salts are chlorides.

6. The method of claim 1 wherein said faujasite has a silica to alumina mole ratio of greater than 3.

7. The method of claim 1 wherein the silica to alumina ratio of said faujasite remains essentially constant.

* * * * *